(12) United States Patent
Shen et al.

(10) Patent No.: US 9,656,237 B2
(45) Date of Patent: May 23, 2017

(54) METHOD OF SCAVENGING HYDROGEN SULFIDE AND MERCAPTANS USING WELL TREATMENT COMPOSITES

(71) Applicant: Baker Hughes Incorporated, Houston, TX (US)

(72) Inventors: Dong Shen, The Woodlands, TX (US); William H. Steiner, Spring, TX (US); Stephen J. Szymczak, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 148 days.

(21) Appl. No.: 14/448,102

(22) Filed: Jul. 31, 2014

(65) Prior Publication Data

US 2016/0030916 A1 Feb. 4, 2016

(51) Int. Cl.
| | |
|---|---|
| *B01D 53/48* | (2006.01) |
| *B01D 53/52* | (2006.01) |
| *B01D 53/44* | (2006.01) |
| *B01D 53/72* | (2006.01) |
| *B01D 53/02* | (2006.01) |
| *C02F 1/28* | (2006.01) |
| *B01J 20/02* | (2006.01) |

(Continued)

(52) U.S. Cl.
CPC .......... *B01J 20/14* (2013.01); *B01D 19/0073* (2013.01); *B01D 53/48* (2013.01); *B01J 20/22* (2013.01); *C02F 1/20* (2013.01); *C02F 1/281* (2013.01); *C02F 1/283* (2013.01); *C02F 1/285* (2013.01); *C02F 1/286* (2013.01); *C10G 29/20* (2013.01); *C10G 70/00* (2013.01); *B01D 53/02* (2013.01); *B01D 2251/80* (2013.01); *B01D 2253/102* (2013.01); *B01D 2253/106* (2013.01); *B01D 2253/108* (2013.01); *B01D 2253/20* (2013.01); *B01D 2253/202* (2013.01); *B01D 2253/306* (2013.01); *B01D 2253/311* (2013.01); *B01D 2256/24* (2013.01); *B01D 2257/304* (2013.01); *B01D 2257/306* (2013.01); *C02F 2101/101* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 4,013,587 A | 3/1977 | Fischer et al. | |
| 4,246,243 A * | 1/1981 | Fox | B01D 53/52 |
| | | | 175/64 |

(Continued)

FOREIGN PATENT DOCUMENTS

| | | |
|---|---|---|
| CA | 2889615 A1 | 6/2014 |
| WO | WO2006129258 | 12/2006 |
| WO | WO2016014310 | 1/2016 |

OTHER PUBLICATIONS

Acros Organics, "Jan. 2000 Catalog of Organics and Fine Chemicals." (c) 2001 Fisher Scientific Co., LLC (excerpt).*

(Continued)

*Primary Examiner* — Daniel Berns
(74) *Attorney, Agent, or Firm* — John Wilson Jones; Jones Delflache LLP

(57) ABSTRACT

Hydrogen sulfide and mercaptans may be removed from a fluid or gaseous stream by introducing a composite to the fluid or gaseous stream containing a hydrogen sulfide scavenger adsorbed onto a water-insoluble adsorbent.

19 Claims, 1 Drawing Sheet

(51) Int. Cl.
*B01J 20/12* (2006.01)
*B01J 20/14* (2006.01)
*B01J 20/16* (2006.01)
*B01J 20/18* (2006.01)
*B01J 20/20* (2006.01)
*B01J 20/22* (2006.01)
*B01J 20/24* (2006.01)
*B01J 20/26* (2006.01)
*B01J 20/28* (2006.01)
*C10G 70/00* (2006.01)
*C10G 29/20* (2006.01)
*B01D 19/00* (2006.01)
*C02F 1/20* (2006.01)
*C02F 101/10* (2006.01)
*C02F 103/10* (2006.01)

(56) References Cited

U.S. PATENT DOCUMENTS

| | | | |
|---|---|---|---|
| 4,390,456 A | 6/1983 | Sanchez et al. | |
| 5,236,595 A * | 8/1993 | Wang | B01J 39/04 210/141 |
| 5,278,112 A * | 1/1994 | Klatte | B01D 46/00 502/60 |
| 5,552,060 A | 9/1996 | Roof | |
| 5,840,177 A | 11/1998 | Weers et al. | |
| 5,964,291 A | 10/1999 | Bourne et al. | |
| 6,024,866 A | 2/2000 | Weers et al. | |
| 6,117,310 A | 9/2000 | Rivers | |
| 6,992,048 B2 | 1/2006 | Reddy et al. | |
| 7,264,786 B2 * | 9/2007 | Pakulski | B01D 53/485 423/228 |
| 7,426,961 B2 | 9/2008 | Stephenson et al. | |
| 7,438,877 B2 | 10/2008 | Salma et al. | |
| 7,491,682 B2 | 2/2009 | Gupta et al. | |
| 7,493,955 B2 | 2/2009 | Gupta et al. | |
| 7,598,209 B2 | 10/2009 | Kaufman et al. | |
| 7,686,081 B1 | 3/2010 | Becker | |
| 7,718,586 B2 | 5/2010 | Schield et al. | |
| 7,977,283 B2 | 7/2011 | Gupta | |
| 8,022,017 B2 | 9/2011 | Taylor | |
| 8,022,018 B2 | 9/2011 | Taylor | |
| 8,048,175 B2 | 11/2011 | Yang et al. | |
| 8,354,361 B2 | 1/2013 | Taylor | |
| 8,357,306 B2 | 1/2013 | Yang et al. | |
| 8,679,203 B2 | 3/2014 | O'Brien et al. | |
| 8,734,637 B2 | 5/2014 | Taylor | |
| 9,010,430 B2 | 4/2015 | Darby et al. | |
| 9,029,300 B2 | 5/2015 | Gupta | |
| 2002/0128157 A1 | 9/2002 | Bates et al. | |
| 2004/0060702 A1 | 4/2004 | Kotlar et al. | |
| 2004/0074646 A1 | 4/2004 | Kotlar et al. | |
| 2005/0022991 A1 | 2/2005 | Rao | |
| 2005/0028976 A1 | 2/2005 | Nguyen et al. | |
| 2005/0034868 A1 | 2/2005 | Frost et al. | |
| 2006/0065396 A1 | 3/2006 | Dawson et al. | |
| 2007/0173417 A1 | 7/2007 | Kaufman et al. | |
| 2008/0058229 A1 | 3/2008 | Berkland et al. | |
| 2008/0217012 A1 | 9/2008 | Delorey et al. | |
| 2008/0287324 A1 | 11/2008 | Pursley et al. | |
| 2009/0114247 A1 | 5/2009 | Brown et al. | |
| 2009/0131285 A1 | 5/2009 | Wang et al. | |
| 2009/0325825 A1 | 12/2009 | Gupta et al. | |
| 2010/0059224 A1 | 3/2010 | Palamara et al. | |
| 2010/0175875 A1 | 7/2010 | Becker et al. | |
| 2012/0012326 A1 | 1/2012 | Darby et al. | |
| 2012/0252706 A1 | 10/2012 | Steiner | |
| 2012/0318515 A1 | 12/2012 | Cawiezel et al. | |
| 2013/0126158 A1 | 5/2013 | Gupta | |
| 2015/0075792 A1 | 3/2015 | Brandl et al. | |
| 2015/0198010 A1 | 7/2015 | Doan et al. | |
| 2015/0330197 A1 | 11/2015 | Brannon et al. | |

OTHER PUBLICATIONS

John B. Weirich, et al.; Field Application of Chemically Treated Substrate in Pre-Packed Well Screen; SPE 141054,(published 2011).

* cited by examiner

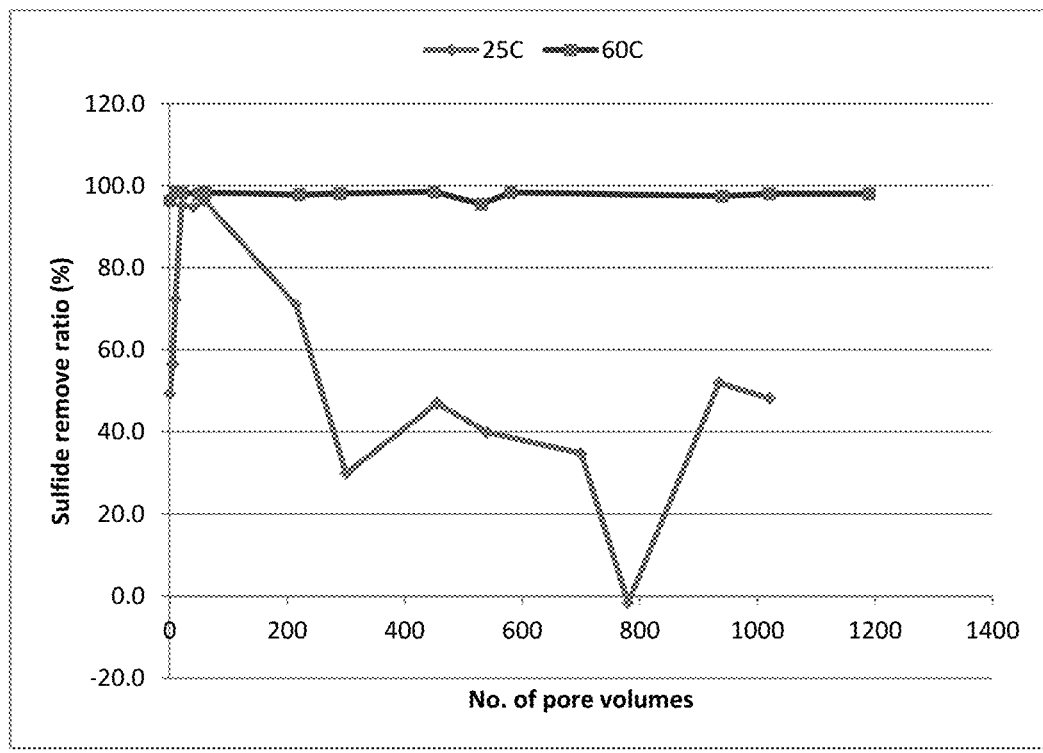

METHOD OF SCAVENGING HYDROGEN SULFIDE AND MERCAPTANS USING WELL TREATMENT COMPOSITES

FIELD OF THE DISCLOSURE

Hydrogen sulfide and/or mercaptans may be removed from a fluid stream by contacting the stream with a well treatment composite having a hydrogen sulfide scavenger adsorbed onto a water-insoluble adsorbent.

BACKGROUND OF THE DISCLOSURE

In the drilling, production, transport, storage, and processing of crude oil, including waste water associated with crude oil production, and in the storage of residual fuel oil, hydrogen sulfide and mercaptans are often encountered. The presence of hydrogen sulfide and mercaptans is objectionable because they often react with other hydrocarbons or fuel system components. Further, hydrogen sulfide and mercaptans are often highly corrosive as well as emit highly noxious odors. Uncontrolled emissions of hydrogen sulfide gives rise to severe health hazards. Burning of such vapors neither solves toxic gas problems nor is economical since light hydrocarbons have significant value.

Furthermore, hydrogen sulfide and mercaptans are often present in underground water removed with crude oil, in crude oil itself and in gases associated with such water and oil. When water and oil are separated from each other, they emit foul odors. For instance, hydrogen sulfide is emitted as a gas which is associated with water and hydrocarbon vapors. Natural gases further often contain hydrogen sulfide and mercaptans.

Treatments for removal of hydrogen sulfide and mercaptans from hydrocarbons and other substrates include the use of various reactive organic compounds. For example, U.S. Pat. No. 6,063,346 discloses the use of maleimides, formaldehydes, amines, carboxamides, alkylcarboxyl-azo compounds and cumine-peroxide compounds for the removal of hydrogen sulfide and mercaptans. Further, U.S. Pat. No. 5,128,049 discloses the use of certain morpholino and amino derivatives for the removal of hydrogen sulfide. In addition, U.S. Pat. Nos. 8,022,017; 7,264,786; 6,063,346 and 5,128,049 disclose the use of triazines to remove hydrogen sulfide.

Since the generation of hydrogen sulfide and mercaptans is often continuous throughout drilling, production, transport, storage and processing of crude oil as well as underground water, there is a need for the gradual and consistent release of hydrogen sulfide scavengers for removing such compounds.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method for scavenging hydrogen sulfide and/or mercaptans from a liquid or gaseous stream is provided. In this method, the liquid or gaseous stream is brought into contact with a composite of a hydrogen sulfide scavenger adsorbed onto a water-insoluble adsorbent. The hydrogen sulfide and/or mercaptans are removed from the liquid or gaseous stream by continuously releasing the hydrogen sulfide scavenger from the composite.

In another embodiment of the disclosure, a method for reducing the amount of hydrogen sulfide and/or mercaptans in a hydrocarbon producing reservoir is provided. In this method, a scavenging effective amount of a composite of a hydrogen sulfide scavenger adsorbed onto a water-insoluble adsorbent is pumped into the reservoir. Hydrogen sulfide and/or mercaptans are removed from the liquid or gaseous stream by continuously releasing the hydrogen sulfide scavenger from the composite.

Accordingly, the present disclosure includes features and advantages which are believed to enable it to advance downhole tool technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following FIGURES are part of the present specification, included to demonstrate certain aspects of various embodiments of this disclosure and referenced in the detailed description herein:

FIG. 1 illustrates the removal ratio of sulfides in a hydrogen sulfide containing effluent stream in the presence of a hydrogen sulfide scavenger adsorbed onto a water-insoluble adsorbed as defined herein.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ."

In the present disclosure, an aqueous or hydrocarbon substrate is brought into contact with a composite. The composite has a hydrogen sulfide scavenger adsorbed onto a solid adsorbent. The weight ratio of hydrogen sulfide scavenger to water-insoluble adsorbent is generally between from about 90:10 to about 10:90.

As used herein, the term "hydrogen sulfide scavenger" shall include those scavengers useful in the treatment of aqueous and hydrocarbon substrates that are rendered "sour"

by the presence of sulfhydryl compounds. The term "mercaptan" shall include, in addition to hydrogen sulfide, alkyl mercaptans and thiols of the formula R—SH where R is an unsubstituted or substituted alkyl, thiol carboxylic acids and dithio acids. As used herein, the term "aqueous substrate" shall refer to any "sour" aqueous substrate, including waste water streams in transit to or from municipal waste water treatment facilities, tanning facilities, and the like. The term "hydrocarbon substrate" is meant to include unrefined and refined hydrocarbon products, including natural gas, derived from petroleum or from the liquefaction of coal, both of which contain hydrogen sulfide or other sulfur-containing compounds. Thus, particularly for petroleum-based fuels, the term "hydrocarbon substrate" includes, but is not limited to, wellhead condensate as well as crude oil which may be contained in storage facilities at the producing field. "Hydrocarbon substrate" also includes the same materials transported from those facilities by barges, pipelines, tankers, or trucks to refinery storage tanks, or, alternately, transported directly from the producing facilities through pipelines to the refinery storage tanks. The term "hydrocarbon substrate" also includes refined products, interim and final, produced in a refinery, including distillates such as gasolines, distillate fuels, oils, and residual fuels and to vapors produced by the foregoing materials.

The method defined herein is therefore applicable to a wide variety of fluid streams, including liquefied petroleum gas as well as crude oil and petroleum residual fuel, heating oil, etc. In addition, the method is applicable to gaseous hydrocarbon streams. For instance, the composite may be contacted with wet or dry gaseous mixtures of hydrogen sulfide and/or mercaptan and hydrocarbon vapors, such as is found, for instance, in natural gas or obtained in the drilling, removal from the ground, storage, transport, and processing of crude oil.

The method disclosed herein has particular applicability in the removal of hydrogen sulfide and mercaptans of the formula R—SH wherein R is an alkyl group having from 1 to 40 carbon atoms and preferably from 1 to 20 carbon atoms, most preferably from 1 to 6 carbon. Such mercaptans are especially desirable for removal in light of their noxious odors and corrosive nature.

The composite containing the adsorbed scavenger may be added to any aqueous or nonaqueous medium containing hydrogen sulfide and/or mercaptans where the sulfides are sought to be reduced. Such media include wet gaseous mediums containing water vapors and/or hydrocarbon vapors. Thus, the method disclosed herein is useful in controlling hydrogen sulfide and/or mercaptans in water systems, oil and gas production and storage systems, and other similar systems. The hydrogen sulfide scavenger, upon being released from the composite reacts with the hydrogen sulfide and mercaptans so as to provide products which are environmentally benign.

Generally, for industrial or commercial use, the composite may be contacted with a stream containing the hydrogen sulfide or mercaptans for removal. Contact can occur in a variety of containers, such as a process or transport line, a separate stirred or non-stirred container or other vessels such as scrubbers or strippers. Further, the composite may be added via surface or downhole equipment or at any time in the process stream in recovering crude oil so as to remove the noxious quality and corrosive nature of the hydrogen sulfide and mercaptans in the processing system.

In general, the composite containing the adsorbed scavenger is injected into or otherwise brought into intimate contact with the liquid hydrocarbon, hydrogen sulfide and/or mercaptan and, when present, water and/or solvent in any convenient manner. With emissions from a residual fuel oil, the composite may be stirred into the fuel oil. When used with a natural gas, the natural gas may be scrubbed with an aqueous or nonaqueous solution containing the composite. Additionally, when the natural gas, as it often does, contains water vapors, the composite may be injected into a stream of the gas moving within a conduit. In such case, when the water vapors are removed from the natural gas as a liquid, the product resulting from reaction of the hydrogen sulfide scavenger released from the composite will also be removed.

The hydrogen sulfide scavenger is preferably a liquid material which is capable of being slowly released from the adsorbent. If the hydrogen sulfide scavenger is a solid, it can be dissolved in a suitable solvent, thus making it a liquid.

Exemplary hydrogen sulfide scavengers include alkylenepolyamines, such as those disclosed in U.S. Pat. No. 6,024,866; quaternary ammonium hydroxides and/or quaternary ammonium alkoxides, such as those disclosed in U.S. Pat. Nos. 5,840,177 and 8,769,203; maleimides, formaldehydes, amines, carboxamides, alkylcarboxyl-azo compounds and cumine-peroxide such as those disclosed in U.S. Pat. No. 6,063,346; diazo compounds, azodicarboxylates and bisoxazolidines such as those disclosed in U.S. Pat. Nos. 7,718,586; 8,048,175; and 6,117,310, respectively; morpholino derivatives such as those disclosed in U.S. Pat. No. 5,128,049; triazine derivatives, such as those disclosed in U.S. Pat. Nos. 7,264,786; 7,438,877; 8,734,637; 6,063,346 and 5,128,049; non-nitrogen hydrogen sulfide scavengers such as those disclosed in U.S. Pat. No. 8,357,306 as well as epoxides such as those disclosed in U.S. Pat. No. 5,552,060. All of the U.S. patents referenced in this paragraph are herein incorporated by reference. Mixtures of hydrogen sulfide scavengers may also be used.

The composite is prepared by adsorbing the hydrogen sulfide scavenger from a liquid onto the water-insoluble adsorbent. This may occur in the presence of a metallic salt. The product containing the adsorbed hydrogen sulfide scavenger may then be dried.

Adsorption of the hydrogen sulfide scavenger onto the water-insoluble adsorbent reduces (or eliminates) the amount of scavenger required to be in solution. The adsorption of the liquid (or solution of) hydrogen sulfide scavenger onto the solid adsorbent limits the availability of the free hydrogen sulfide scavenger in water. In addition, the composite itself has limited solubility in water. Further, since the hydrogen sulfide scavenger is adsorbed onto a substrate, only a small amount of hydrogen sulfide scavenger may be released into the aqueous medium.

The amount of hydrogen sulfide scavenger in the composite is that amount sufficient to effectuate the desired result over a sustained period of time and may be as low as 1 ppm. Generally, the amount of hydrogen sulfide scavenger in the composite is from about 0.05 to about 50 (preferably from about 2 to about 45) weight percent based upon the total weight of the composite. Such small amounts of hydrogen sulfide scavenger may be sufficient for up to 1,000 pore volumes.

When placed into a well, the hydrogen sulfide scavenger slowly dissolves at a generally constant rate over an extended period of time in the water or hydrocarbons which are contained in the formation and/or well. The composite therefore permits a continuous supply of the hydrogen sulfide scavenger into the targeted area which, in turn, is dependent upon the adsorption/desorption properties of the agent to adsorbent. Generally, the lifetime of a single treatment using the composite defined herein is between three and twelve months of continuous release and may be in excess of 3 years depending upon the volume of water present (e.g., produced in the production well) and the amount of hydrogen sulfide scavenger bound to the water-insoluble adsorbent.

The water insoluble adsorbent may be any of various kinds of commercially available high surface area materials having the affinity to adsorb the desired hydrogen sulfide scavenger. Typically, the surface area of the adsorbent of the well treating composite is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The composites defined herein may be employed with carrier or treatment fluids in order to facilitate placement of the composite. In this regard, any carrier fluid suitable for transporting the composite may be used. Well treatment compositions containing the composite may be gelled or non-gelled. In one embodiment, the well treatment composites described herein may be introduced or pumped into a well as neutrally buoyant particles in, for example, a saturated sodium chloride solution carrier fluid or a carrier fluid that is any other completion or workover brine known in the art.

Suitable carrier fluids include or may be used in combination with fluids have gelling agents, cross-linking agents, gel breakers, surfactants, foaming agents, demulsifiers, buffers, clay stabilizers, acids, or mixtures thereof.

The carrier fluid may be a brine (such as a saturated potassium chloride or sodium chloride solution), salt water, fresh water, a liquid hydrocarbon, or a gas such as nitrogen or carbon dioxide. The composite may further be advantageously employed in liquefied gas and foamed gas carrier fluids, such as liquid $CO_2$, $CO_2/N_2$, and foamed $N_2$ in $CO_2$ based systems. The amount of composite present in a composition containing the composite and carrier fluid is typically between from about 15 ppm to about 100,000 ppm.

The composite may be used in any well treatment operation where the presence of hydrogen sulfide and/or mercaptans may be encountered. As such, the well treatment composite may be a component of a fracturing fluid (with or without the presence of a proppant), an acidizing fluid, drilling fluid, completion fluid, acidizing fluid, etc. In addition, the composite may be used during the transport, storage and/or processing of oil or gas to address issues raised by the presence of hydrogen sulfide and/or mercaptans.

The composites are particularly effective when used in environments characterized by high pH such as at a pH in excess of 7.0. Such composites are further effective in fluids having a pH in excess of 11.0.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Liquid 1,3,5-tris(2-hydroxyethyl)-hexahydro-s-triazine was added into a mixer with approximately 800 g of 10/50 mesh diatomaceous earth (Celite MP-79) adsorbent at a rate in which the liquid was readily adsorbed. After all of the liquid was added, mixing was continued until a homogenous blend was produced. The resulting composite contained approximately 15% by weight of the triazine.

Example 2

Approximately 54 g 20/40 Ottawa white sand and 1.1 g of the composite of Example 1 was packed into a 35 cm length stainless steel column (ID=1.08 cm). The column was eluted with synthetic brine, which contained 1 mol/L NaCl, 1000 ppm Ca++ and about 20 ppm $S^{2-}$ at 25° C. and 60° C., respectively, at a flow rate of 120 ml/hr (corresponding to 275 ft/day linear flow velocity). The effluent solution was collected and analyzed for triazine and $S^{2-}$ concentration to obtain the chemical flow back curve and $S^{2-}$ removal ratio. The pore volume of the column was approximately 12 mL. In order to account for the oxidation of $S^{2-}$, a 20 ml sample was collected from the reservoir simultaneously as the effluent was collected. The $S^{2-}$ removal ratio was determined by comparing the difference between the sample from the reservoir and effluent. The results at 60° C. are set forth in Table I and are depicted (with the results at 25° C.) in FIG. 1.

TABLE 1

| pore volumes | $S^{2-}$ in reservoir (mg/L) | $S^{2-}$ in effluent (mg/L) | Triazine residual (mg/L) | DTZ residual (mg/L) |
| --- | --- | --- | --- | --- |
| 0 | 19 | 0.68 | 1380 | 510 |
| 10 | 22.5 | 0.35 | 64 | ND |
| 20 | 17 | 0.3 | 18.9 | ND |
| 50 | 19.5 | 0.38 | ND | ND |
| 60 | 21 | 0.35 | ND | ND |
| 220 | 15 | 0.32 | | |
| 290 | 18.5 | 0.35 | | |
| 450 | 16.5 | 0.24 | | |
| 530 | 18 | 0.8 | | |
| 580 | 22.5 | 0.37 | | |
| 940 | 24 | 0.6 | | |
| 1020 | 15.5 | 0.3 | | |
| 1190 | 17 | 0.33 | | |

\*\* DTZ is the product after triazine reacted with $S^{2-}$.

Table I and FIG. 1 illustrate that $H_2S$ scavenger residuals dropped to below detection limits after 50 pore volumes of return fluid at 60° C. while the $S^{2-}$ removal ratio was steady at 98% or above until 1190 pore volumes of return fluid even though no triazine was detected in the effluent (Some of the $S^{2-}$ removal may be contributed to the oxidation).

FIG. 1 illustrate that the presence of $H_2S$ scavenger in the composite renders improved removal of sulfides at 25° C. and that a higher removal ratio (>90%) can be reached at first 50 pore volumes of return fluid. About 20 ppm $S^{2-}$ can be removed at the first 60 to 100 pore volumes of return fluid and after that about 4 to 8 ppm $S^{2-}$ can continued to be removed until 1100 pore volumes.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method for scavenging hydrogen sulfide and/or mercaptans from a liquid or gaseous stream which comprises bringing the stream into contact with a composite of a liquid hydrogen sulfide scavenger adsorbed onto a water-insoluble adsorbent selected from the group consisting of diatomaceous earth, ground walnut shells or a mixture thereof and scavenging hydrogen sulfide and/or mercaptan from the liquid or gaseous stream by continuously releasing the hydrogen sulfide scavenger from the composite, said hydrogen sulfide scavenger being selected from the group consisting of alkylenepolyamines, quaternary ammonium hydroxides, quaternary ammonium alkoxides, maleimides, formaldehydes, amines, carboxamides, alkylcarboxyl-azo compounds, cumine-peroxide, diazo compounds, azodicarboxylates, bisoxazolidines, morpholino derivatives, triazine derivatives and epoxides.

2. The method of claim 1, wherein the liquid or gaseous stream is within a hydrocarbon producing reservoir or a storage vessel.

3. The method of claim 1, wherein the liquid or gaseous stream is an unrefined or refined hydrocarbon product derived from petroleum or from the liquefaction of coal.

4. The method of claim 1, wherein the liquid or gaseous stream is a wet or dry gaseous mixture or hydrocarbon vapors.

5. The method of claim 1, wherein the surface area of the adsorbent is between from about 1 $m^2/g$ to about 100 $m^2/g$.

6. The method of claim 1, wherein the hydrogen sulfide scavenger is continuously released from the composite for a minimum of three months.

7. The method of claim 1, wherein the amount of hydrogen sulfide scavenger in the composite is between from about 0.05 to about 5 weight percent.

8. A method for scavenging hydrogen sulfide and/or mercaptans from a liquid or gaseous stream which comprises bringing the stream into contact with a composite of a liquid hydrogen sulfide scavenger adsorbed onto a water-insoluble adsorbent, wherein the weight ratio of the hydrogen sulfide scavenger to adsorbent in the composite is between from about 90:10 to about 10:90, and scavenging hydrogen sulfide and/or mercaptan from the liquid or gaseous stream by continuously releasing the hydrogen sulfide scavenger from the composite, said hydrogen sulfide scavenger being selected from the group consisting of alkylenepolyamines, quaternary ammonium hydroxides, quaternary ammonium alkoxides, maleimides, formaldehydes, amines, carboxamides, alkylcarboxyl-azo compounds, cumine-peroxide, diazo compounds, azodicarboxylates, bisoxazolidines, morpholino derivatives, triazine derivatives and epoxides.

9. The method of claim 8, wherein the liquid or gaseous stream is within a hydrocarbon producing reservoir or a storage vessel.

10. The method of claim 8, wherein the liquid or gaseous stream is an unrefined or refined hydrocarbon product derived from petroleum or from the liquefaction of coal or is a wet or dry gaseous mixture or hydrocarbon vapors.

11. The method of claim 8, wherein the surface area of the adsorbent is between from about 1 $m^2/g$ to about 100 $m^2/g$.

12. The method of claim 8, wherein the hydrogen sulfide scavenger is continuously released from the composite for a minimum of three months.

13. The method of claim 8, wherein the water-insoluble adsorbent is selected from the group consisting of activated carbon, silica particulate, precipitated silica, zeolite, diatomaceous earth, ground walnut shells and fuller's earth.

14. A method for scavenging hydrogen sulfide and/or mercaptans from a liquid or gaseous stream which comprises bringing the stream into contact with a composite of a liquid hydrogen sulfide scavenger adsorbed onto a water-insoluble adsorbent and scavenging hydrogen sulfide and/or mercaptan from the liquid or gaseous stream by continuously releasing the hydrogen sulfide scavenger from the composite, said hydrogen sulfide scavenger being a triazine.

15. The method of claim 14, wherein the hydrogen sulfide scavenger is continuously released from the composite for a minimum of three months.

16. The method of claim 14, wherein the liquid or gaseous stream is within a hydrocarbon producing reservoir or a storage vessel.

17. The method of claim 14, wherein the amount of hydrogen sulfide scavenger in the composite is between from about 0.05 to about 5 weight percent.

18. The method of claim 14, wherein the water-insoluble adsorbent is selected from the group consisting of activated carbon, silica particulate, precipitated silica, zeolite, diatomaceous earth, ground walnut shells and fuller's earth.

19. The method of claim 18, wherein the water-insoluble adsorbent is diatomaceous earth or ground walnut shells.

* * * * *